(12) United States Patent
Marcy

(10) Patent No.: US 7,740,266 B2
(45) Date of Patent: Jun. 22, 2010

(54) SPRING AND PENDULUM SYSTEM FOR SHOCK ATTENUATION IN TRAILER HITCHES

(75) Inventor: Dewey R. Marcy, Greeley, CO (US)

(73) Assignee: Quick Hitch, Inc., Greeley, CO (US)

( * ) Notice: Subject to any disclaimer, the term of this patent is extended or adjusted under 35 U.S.C. 154(b) by 340 days.

(21) Appl. No.: 11/654,198

(22) Filed: Jan. 17, 2007

(65) Prior Publication Data

US 2007/0170693 A1      Jul. 26, 2007

Related U.S. Application Data

(60) Provisional application No. 60/761,693, filed on Jan. 23, 2006.

(51) Int. Cl.
*B60D 1/50*      (2006.01)
(52) U.S. Cl. .................... 280/489; 280/483; 280/490.1; 280/511
(58) Field of Classification Search ................ 280/489, 280/483, 490.1, 511
See application file for complete search history.

(56) References Cited

U.S. PATENT DOCUMENTS

| | | | | |
|---|---|---|---|---|
| 2,966,369 | A * | 12/1960 | Paul, Jr. ...................... 280/489 |
| 3,534,981 | A * | 10/1970 | Moulton ................... 280/405.1 |
| 4,254,966 | A * | 3/1981 | Mitchell ................... 280/405.1 |
| 4,641,852 | A * | 2/1987 | Kerst et al. .................... 280/489 |
| 6,155,588 | A * | 12/2000 | Maxey ........................ 280/488 |
| 6,494,478 | B1 * | 12/2002 | MacKarvich ............... 280/489 |
| 7,044,493 | B1 * | 5/2006 | Wilson ........................ 280/489 |
| 7,093,845 | B1 * | 8/2006 | Fast ............................ 280/489 |
| 7,377,536 | B2 * | 5/2008 | Rehme ........................ 280/483 |
| 7,380,811 | B2 * | 6/2008 | Rehme ........................ 280/483 |
| 2003/0178811 | A1 * | 9/2003 | Buckner ..................... 280/483 |

\* cited by examiner

*Primary Examiner*—Lesley Morris
*Assistant Examiner*—Marlon A Arce
(74) *Attorney, Agent, or Firm*—Dean P. Edmundson

(57) ABSTRACT

A system is described for attenuating intermittent forces at the interconnection between a towing vehicle and a trailer. The system includes a linear rocking member suspended between the towing vehicle and the trailer, a shock absorber between the linear rocking member and the vehicle, and a pendulum having a fulcrum connected to the vehicle and a swinging component rotationally connected to the linear rocking member, and a fastening device connecting the linear rocking member to the trailer to be towed.

8 Claims, 5 Drawing Sheets

SPRING AND PENDULUM SYSTEM FOR SHOCK ATTENUATION IN TRAILER HITCHES

CROSS-REFERENCE TO RELATED APPLICATION

This application is based upon, and claims priority from, my Provisional Application No. 60/761,693, filed Jan. 23, 2006.

FIELD OF THE INVENTION

This invention relates to economical techniques for alleviating and attenuating the longitudinal surges and vertical shocks that are transferred through a conventional hitch connecting a trailer and a towing vehicle.

BACKGROUND OF THE PRIOR ART

A trailer and a towing vehicle are two relatively independent entities that are interconnected by a hitching device. The trailer and the vehicle each have their own center of gravity, and when in motion each is subjected to its own pitch, yaw, and roll motions. Because of these differing motions by the trailer and towing vehicle, the interconnection between them is subjected to numerous intermittent jerking forces in addition to the motivational force exerted by the towing vehicle on the trailer. These unsteady, irregular and rapidly changing jerking forces are very undesirable. They cause annoyance and discomfort to drivers and their passengers. They place further burdens on the suspension systems of the trailer such that the contents of the trailer can be jostled and damaged. They cause wear and tear on every component of both the trailer and towing vehicle. It is clear that any attenuation of these jerking forces will result in a smoother and better ride which is safer for the occupants of the vehicle and also for the cargo in the trailer.

Prior art includes a multitude of systems for attenuating these jerking forces. Many of these systems are quite elaborate and require numerous springs and/or other shock absorbing devices. Thus, they can be prohibitively expensive. Other simpler systems dampen longitudinal surges but not vertical shocks. Still others dampen vertical shocks but not longitudinal surges.

Because of either the expense involved or a limitation on effectiveness, most of the hitches in use on the road today do not have any capacity to attenuate intermittent jerking motions and forces. An economical technique for attenuating a significant portion of these jerking motions and forces is clearly needed.

BRIEF SUMMARY OF THE INVENTION

The present invention provides a novel arrangement of components featuring a linear rocking member normally centered on the hitch, parallel with the longitudinal axis of the towing vehicle, and suspended between the towing vehicle and the trailer. For hitches that are located forward of the rear axle of the towing vehicle including those for gooseneck trailers and most fifth-wheel arrangements, the linear rocking member is suspended on one end from a short pendulum and supported on the other end by an air spring or other means for absorbing mechanical energy. The ball of a standard ball and socket type of trailer hitch, or the receiving receptacle for the king pin of a fifth wheel type of hitch, is rigidly attached to the linear rocking member near or at the center of the linear rocking member.

For hitches located behind the rear axle of the towing vehicle, the linear rocking member is supported near or at the center by an air spring or other means for absorbing mechanical energy. The front end of the linear rocking member is suspended on an inverted pendulum and the trailer hitch ball is rigidly attached to the rear end of said linear rocking member.

For all hitches, whether behind or ahead of the rear axle of the towing vehicle, the pendulum provides for limited longitudinal displacement between the trailer and towing vehicle such that longitudinal surges in either direction can be attenuated. Both the hitch weight of the trailer and the air spring dampen these longitudinal surges. Vertical shocks are attenuated by the air spring. It is also noted herein that further damping of longitudinal surges can be achieved by restricting the pendulum action with other shock absorbing means such as encasing the pendulum rod ends in spring rubber or elastomeric material.

DETAILED DESCRIPTION OF THE INVENTION

Figure 1:
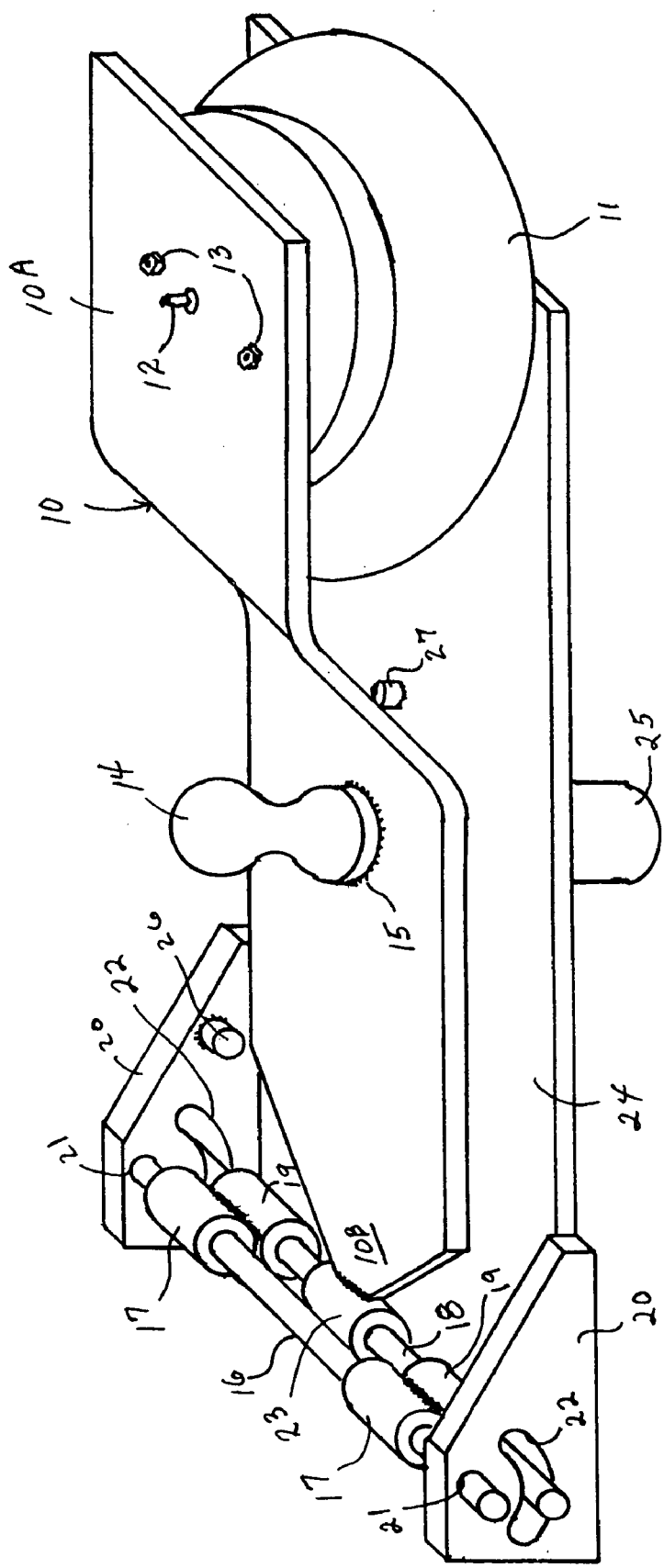
FIG. 1 illustrates a configuration of the present invention that is suitable for use with a ball and socket type of hitch located forward of the rear axle of the towing vehicle such as those generally used on gooseneck trailers.

An embodiment of the present invention suitable for use with a ball and socket hitch located forward of the rear axle of the towing vehicle is illustrated in FIG. 1. Linear rocking member 10 is supported at one end 10A by air spring 11. Zerk 12 is the air inlet valve for air spring 11. Bolts 13 attach air spring 11 to linear rocking member 10. Ball 14 can be welded to linear rocking member 10 at location 15.

Figure 4:
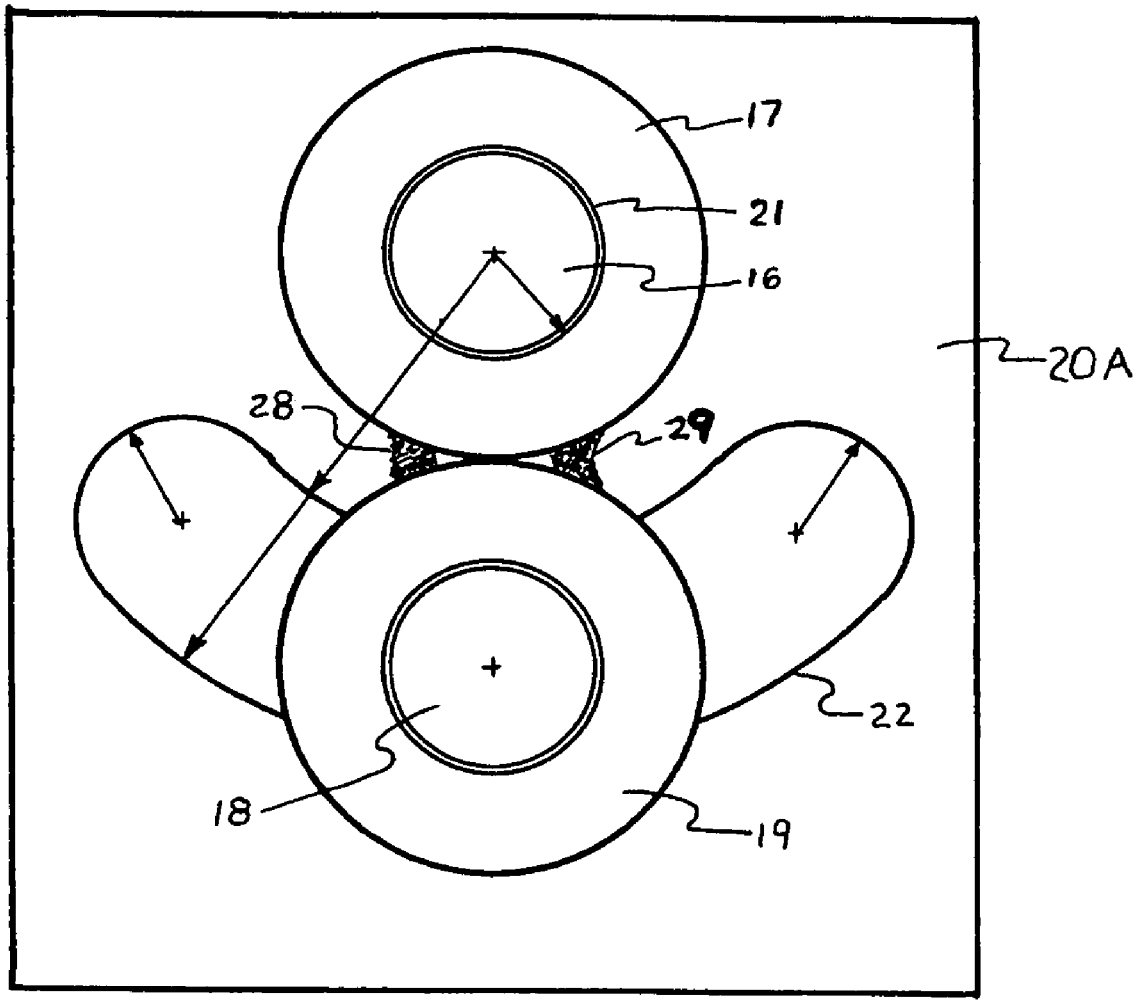
FIG. 4 is a cross-section of the pendulum subassembly and illustrates a simplified technique for making a short sturdy pendulum.

Fulcrum rod 16 with fulcrum cylindrical bushings 17, and swinging rod 18 with cylindrical bushings 19, are parts of a short sturdy pendulum further illustrated in FIG. 4. The internal diameter of cylindrical bushing 17 is a clearance fit with fulcrum rod 16. The internal diameter of swing bushing 19 is a clearance fit with swinging rod 18. Fulcrum rod 16 is supported at its ends by buttress plates 20. The holes 21 in buttress plates 20 are circular and are clearance fits with fulcrum rod 16. Buttress plates 20 have arcuate slots 22 that serve to limit the travel of swinging rod 18. Bushings 19 are welded or otherwise securely attached to bushings 17. In FIG. 4 this attachment is shown as welds 28 and 29.

The longer surfaces of each slot 22 are two concentric circular arcs whose center is at the center of holes 21, which is also the center of the fulcrum. The width of slot 22 is equal to the difference in radii of the two concentric arcs and is a clearance fit with the diameter of swinging rod 18. The length of slot 22 governs the swing of the pendulum and is such that the allowable limits for lateral motion of air springs 11 are not exceeded. The ends of slot 22 are circular arcs with radii slightly larger than the radii of swinging rod 18.

Bushing 23 is welded to the end 10B of linear rocking member 10. The internal diameter of cylindrical bushing 23 is a clearance fit with swinging rod 18.

Buttresses 20 are connected to base 24, which in turn is connected to the bed of the towing vehicle with apparatus 25, which is adapted to fit the hitch of the towing vehicle.

Stop 26 secured to buttress plate 20 serves to limit counterclockwise rotation of the linear rocking member 10. Stop 27 on base plate 24 serves to limit clockwise rotation of the linear rocking member 10. These rotations correspond to pitch motions of the towing vehicle and also of the trailer when the trailer is in the normal position of alignment with the towing vehicle.

Figure 2:
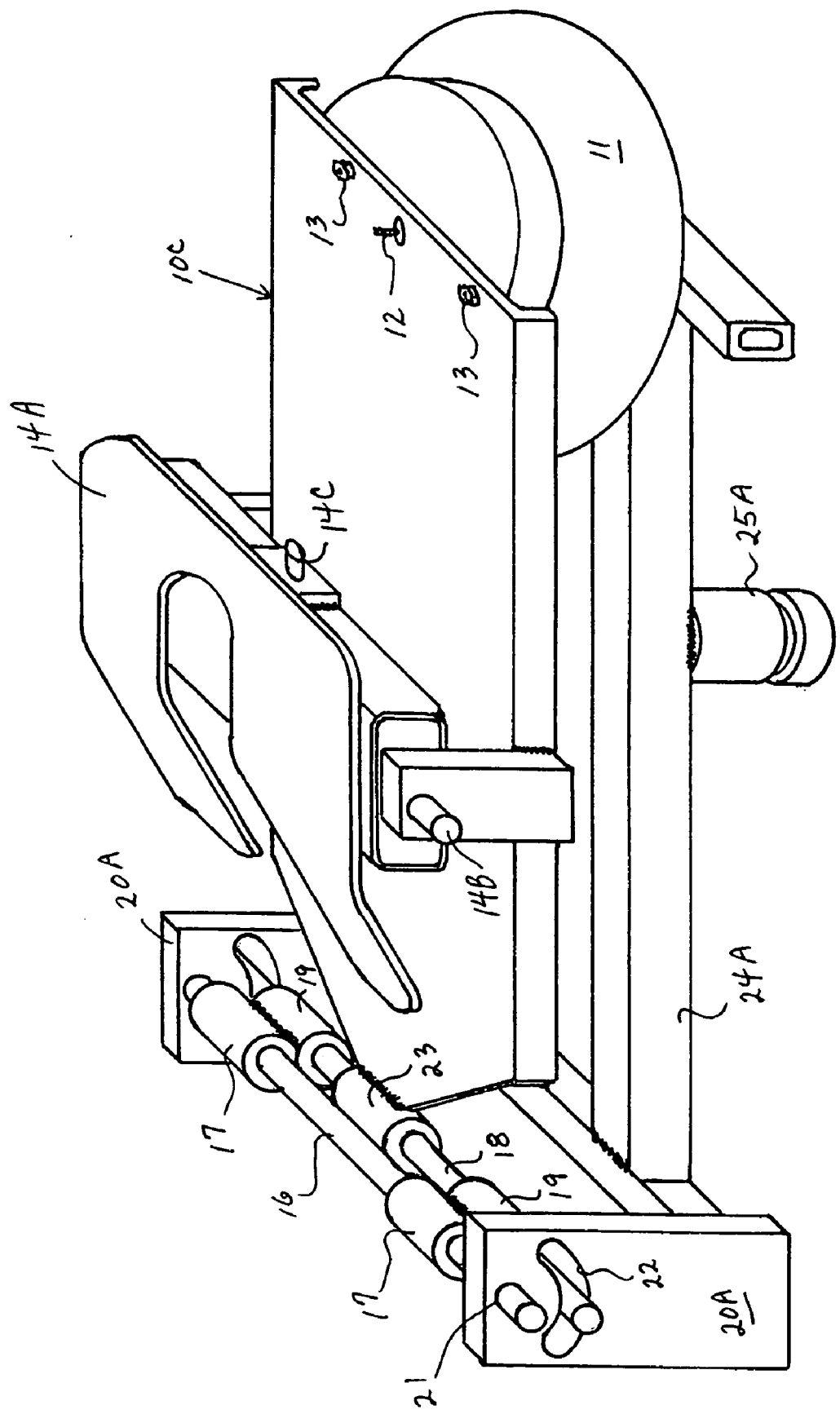
FIG. 2 illustrates a configuration of the present invention that is suitable for use with a kingpin type of trailer hitch, which is also located forward of the rear axle of the towing vehicle.

FIG. 2 illustrates a second embodiment of the invention suitable for use with a kingpin type of trailer hitch. Kingpin trailer hitches are also located forward of the rear axle of the towing vehicle. In this embodiment, the linear rocking member 10C can be an inverted channel. Air springs 11, zerk 12, and bolts 13 are the same as described above in connection with FIG. 1. Fulcrum rod 16 with cylindrical bushings 17 swinging rod 18 with cylindrical bushings 19 form a pendulum of the type shown and described in connection with the embodiment of FIG. 1. On end of linear rocking member 10C is welded to bushing 23 on rod 18. Buttresses 20A are secured to plate 24A, and apparatus 25A is adapted to connect the entire apparatus to the hitch of the towing vehicle.

Receiving mechanism 14A is for receiving and releasably securing the kingpin of the trailer to be towed. Rotation on shaft 14B allows pitch motions of the trailer with respect to the towing vehicle. Rotation at point 14C allows limited roll motions of the trailer with respect to the towing vehicle. Kingpin receiving mechanism 14A normally has a latching mechanism that is not shown in FIG. 2 for reasons of clarity.

Figure 3:
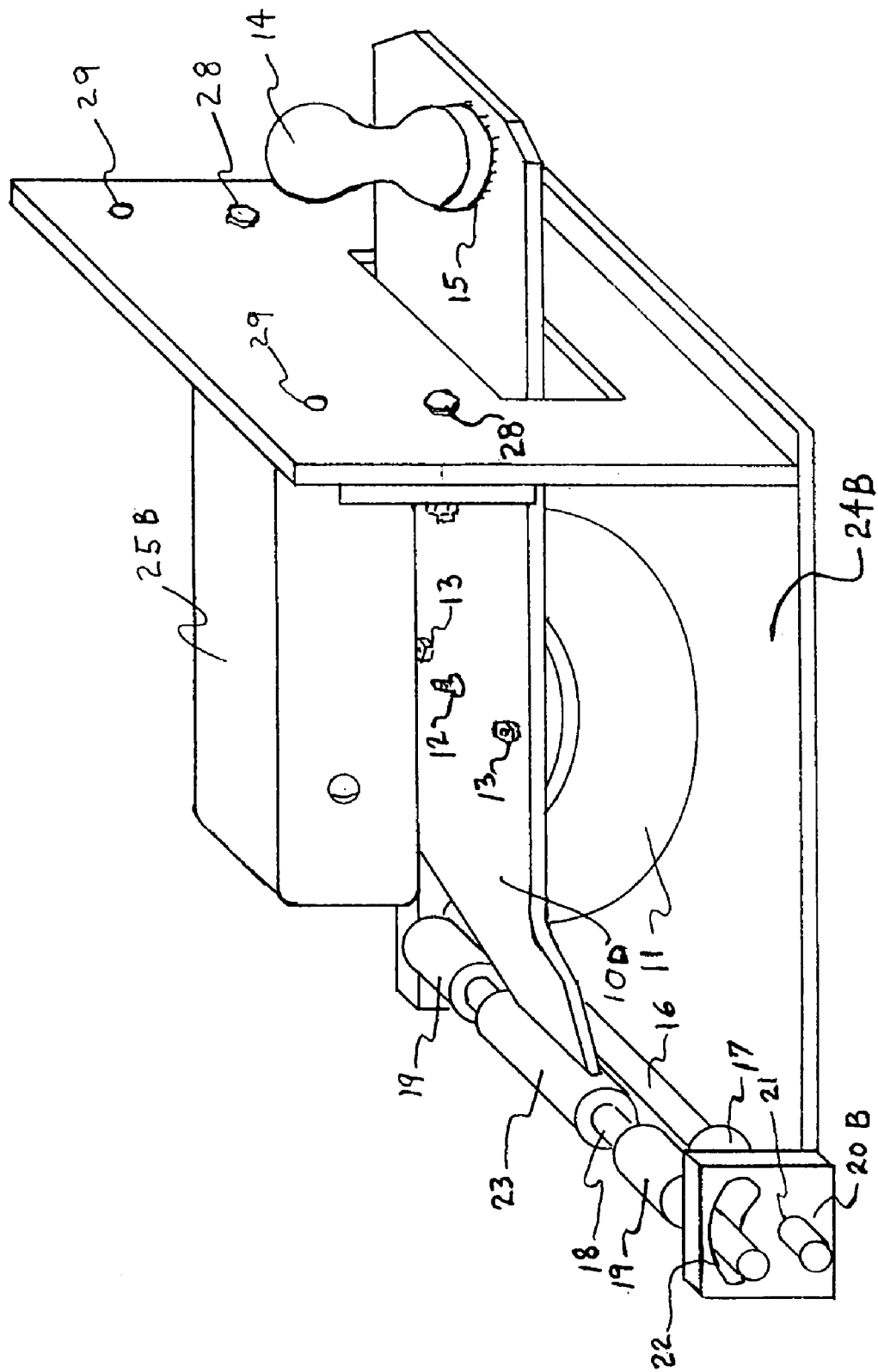
FIG. 3 illustrates a configuration of the present invention that is suitable for use with a ball and socket type of hitch located behind the rear axle of the towing vehicle. These hitches are known as receiver hitches or as bumper hitches.

FIG. 3 illustrates the third embodiment of the invention wherein the hitch is located behind the rear axle of the towing vehicle. For this embodiment, the positions of air spring 11 and ball 14 on linear rocking member 10D are interchanged such that ball 14 is on the rearward end of the linear rocking member 10D and air spring 11 is near the midpoint of the linear rocking member 10D. For this third embodiment, the pendulum mechanism comprised of fulcrum rod 16, cylindrical bushings 17, swinging rod 18, and swinging bushings 19, is inverted with slots 22 on top and fulcrum hole 21 on the bottom, and linear rocking member 10 is cantilevered. A receiver tube 25B is mounted to the base 24B with bolts 28. Holes 29 allow for vertical adjustability of the receiver tube 25B. The receiver tube is of a standard size to fit standard receiver hitches mounted on the towing vehicle.

FIG. 4 is a typical cross-section through the pendulum mechanism of the invention and illustrates a method of constructing the pendulum mechanism. Fulcrum cylindrical bushing 17 is welded to swing cylindrical bushing 19 at locations 28 and 29 forming a short sturdy arm for the pendulum.

In operation, air spring 11 provides for vertical travel through the hitch and the pendulum mechanism provides some variation in the longitudinal distance between the towing vehicle and the trailer. Together they provide for some relative displacement between towing vehicle and trailer in any combination of vertical and longitudinal directions. Both the restoring forces of the pendulum and air pressure within air spring 11 attenuate intermittent forces in various combinations of these two directions. Because a straight line between the center of gravity of the towing vehicle and the center of gravity of the trailer will rarely pass through the pivot points of the hitch, almost all intermittent forces through the hitch will be some combination of vertical and longitudinal forces and both air spring 11 and the pendulum mechanism will work to attenuate them.

Figure 5:
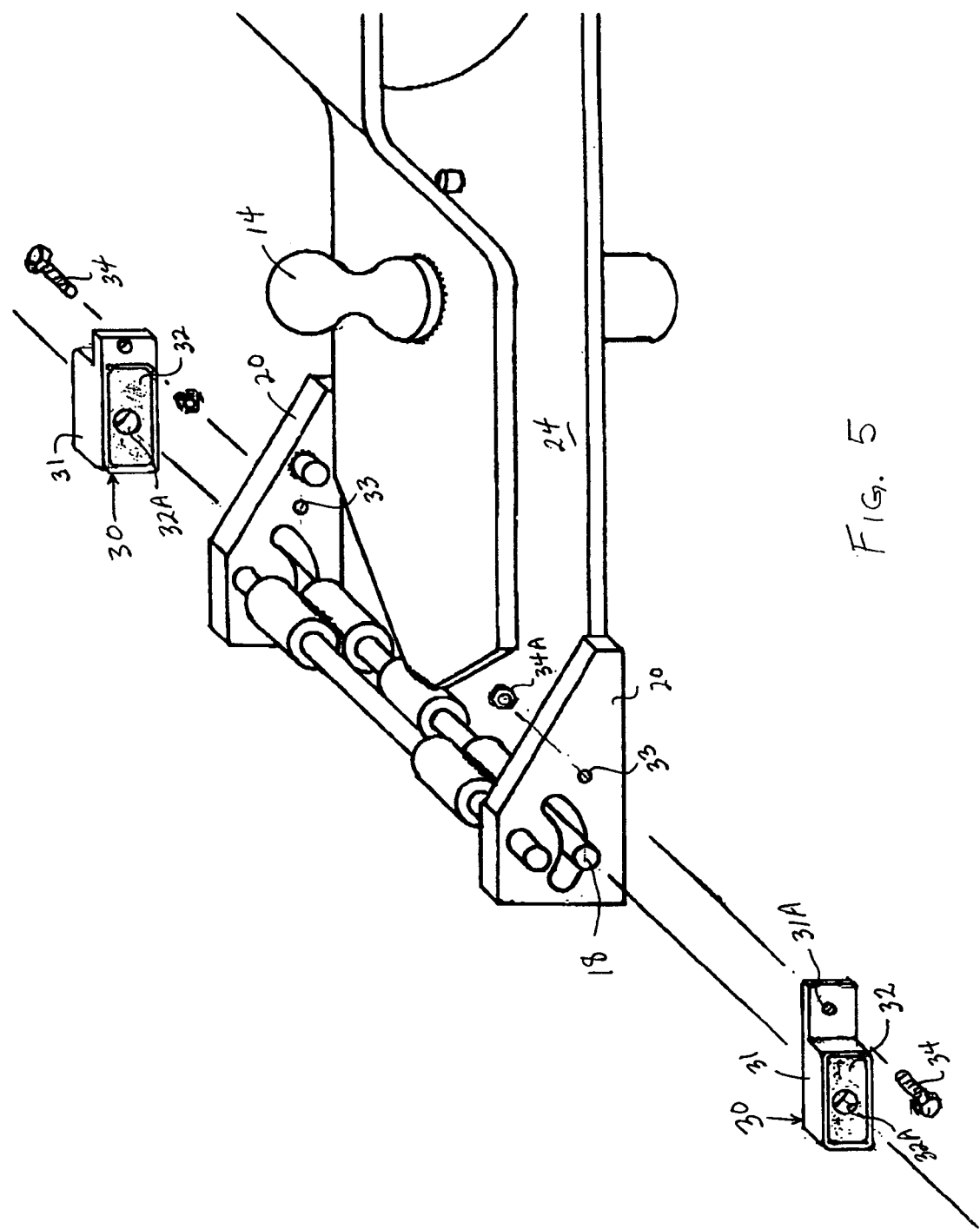
FIG. 5 illustrates another embodiment of a shock attenuation system which is useful in the present invention.

In FIG. 5 there is illustrated another embodiment of the system of the invention. In this embodiment, further damping of longitudinal surges during towing is achieved by restricting the pendulum action using a damper system 30 comprising a rubber or elastomeric member. The rubber or elastomer member 32 (having an opening 32A therethrough) is positioned on each end of the pendulum rod 18. The rubber or elastomer member is captured or secured within a steel box or frame 31 having an aperture 31A for mounting bolt 34. The bolt 34 is passed through hole 33 in buttress member 20 and secured with a threaded nut 34A. A cover may be secured over the outside of the box 31. The rubber serves to dampen the movement of the pendulum rod 18 so as to alleviate the shocks of sudden starts or stops of the towing vehicle.

Other variants are possible without departing from the scope of this invention.

What is claimed is:

1. A system for attenuating intermittent forces at the interconnection between a towing vehicle and a trailer during towing, the system comprising:
   (a) a linear rocking member suspended between said towing vehicle and said trailer;
   (b) means for absorbing mechanical energy mounted between said linear rocking member and said towing vehicle;
   (c) a pendulum comprising a fulcrum and a swinging component, wherein said fulcrum is connected to said towing vehicle and said swinging component is rotationally connected to said linear rocking member near one end of said linear rocking member; wherein said swinging component comprises a rod having first and second ends; and further comprising damping means secured to said ends of said rod for damping movement of said pendulum; wherein said damping means comprises a rubber member having an opening for receiving one said end of said rod; wherein said rubber member is carried within a housing secured to a support for said pendulum; and
   (d) a fastening device for connecting said linear rocking member to said trailer.

2. The system in accordance with claim 1, wherein said fastening device is located near the midpoint of said linear rocking member and said means for absorbing mechanical energy is located near the particular end of said linear rocking member that is opposite to the end connected to said pendulum.

3. The system in accordance with claim 1, wherein said means for absorbing mechanical energy is located near the midpoint of said linear rocking member and said fastening device is located near the rearward end of said linear rocking member.

4. The system in accordance with claim 1, wherein said fastening device comprises a ball and socket hitch.

5. The system in accordance with claim 1, wherein said fastening device comprises a kingpin type hitch.

6. The system in accordance with claim 1, wherein said means for absorbing mechanical energy is an air spring.

7. The system in accordance with claim 1, wherein said swinging component of said pendulum is constructed by joining two aligned and parallel cylindrical bushings together.

8. A system for attenuating intermittent forces at the interconnection between a towing vehicle and a trailer during towing, the system comprising:

(a) a linear rocking member suspended between said towing vehicle and said trailer;
(b) means comprising an air spring for absorbing mechanical energy mounted between said linear rocking member and said towing vehicle;
(c) a pendulum comprising a fulcrum and a swinging component, wherein said fulcrum is connected to said towing vehicle and said swinging component is rotationally connected to said linear rocking member near one end of said linear rocking member; and
(d) a fastening device for connecting said linear rocking member to said trailer.

* * * * *